US006877438B2

(12) United States Patent  (10) Patent No.: US 6,877,438 B2
Olbort  (45) Date of Patent: Apr. 12, 2005

(54) DEVICE FOR CHANGING THE DIRECTION OF MEANS OF TRANSPORT

(75) Inventor: Josef Herbert Olbort, Mainbernheim (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 144 days.

(21) Appl. No.: 10/258,614

(22) PCT Filed: May 4, 2001

(86) PCT No.: PCT/DE01/01705
§ 371 (c)(1),
(2), (4) Date: Nov. 6, 2002

(87) PCT Pub. No.: WO01/86068
PCT Pub. Date: Nov. 15, 2001

(65) Prior Publication Data
US 2003/0106454 A1 Jun. 12, 2003

(30) Foreign Application Priority Data

May 11, 2000 (DE) ........................ 100 22 965

(51) Int. Cl.⁷ ................................ B61J 3/00
(52) U.S. Cl. ................. 104/88.01; 198/465.1; 104/35
(58) Field of Search .............. 104/88.01, 130.1, 104/118, 35, 36, 39, 43, 45, 46; 198/465.1, 465.2; 186/49, 69

(56) References Cited

U.S. PATENT DOCUMENTS

| 316,482 A | * | 4/1885 | Porter .................. 104/39 |
| 1,249,346 A | | 12/1917 | Dellamore |
| 1,800,722 A | * | 4/1931 | Edson .................. 104/38 |
| 4,009,773 A | * | 3/1977 | Brenner et al. ........ 198/378 |
| 4,416,202 A | * | 11/1983 | Rooklyn ............... 104/130.01 |
| 4,899,666 A | * | 2/1990 | Meier ................. 104/88.04 |
| 5,086,704 A | * | 2/1992 | Mueller .............. 104/44 |
| 6,494,664 B1 | * | 12/2002 | Winter, Jr. ............ 414/401 |

FOREIGN PATENT DOCUMENTS

| CH | 653 644 A5 | 1/1986 |
| DE | 40 06 486 A1 | 9/1990 |
| DE | 41 19 407 A1 | 12/1992 |
| DE | 39 10 444 C2 | 10/1993 |
| DE | 43 45 090 A1 | 7/1995 |
| DE | 197 08 389 A1 | 9/1998 |
| WO | WO 98/12133 | 3/1998 |

* cited by examiner

Primary Examiner—Frantz F. Jules
(74) Attorney, Agent, or Firm—Jones, Tullar & Cooper, P.C.

(57) ABSTRACT

A device that is usable to change the direction of a transport assembly, on which feed roller may be transported, includes a lower section and an upper section. The upper section is pivotally mounted on the lower section. The transport assembly is arranged on the side or on the top of the upper section and the upper section can be pivoted by an angular amount, relative to the lower section, by use of a drive unit. A drive motor of the drive unit has its output transmitted to the upper section by a drive belt. A positive drive exists between the motor and belt and a friction drive exists between the belt and the upper section.

20 Claims, 3 Drawing Sheets

DEVICE FOR CHANGING THE DIRECTION OF MEANS OF TRANSPORT

FIELD OF THE INVENTION

Figure 1:
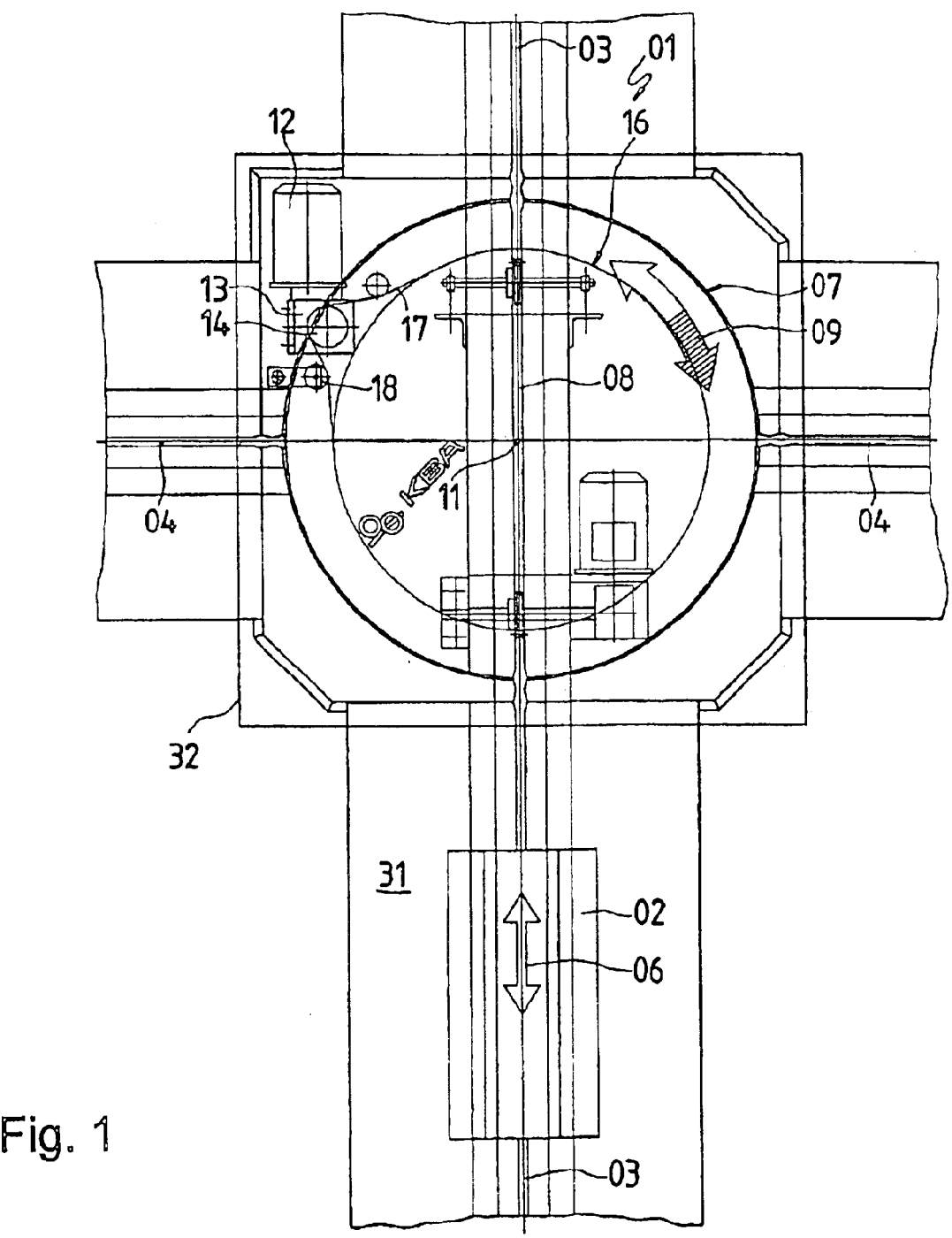

The present invention is directed to devices for changing the direction of conveying or transport devices. The device includes an upper element and a lower element. The two elements are connected and are relatively movable.

BACKGROUND OF THE INVENTION

Turntables are known from DE 39 10 444 C2. These turntables can be rotated by 180° for coordinating the roll-off or discharge direction of horizontally stored supply rolls.

Rotatable turntables are also known from WO 98/12133 A1. These turntables have guides crossing each other and are provided with sets of track for receiving supply roll conveying carts. These turntables are rotatable over at least 90° and up to preferably 360°, so that the supply roll conveying carts can be shifted between crossing sets of track.

DE 41 19 407 A1 discloses turntables which are driven by the use of a belt via an interspersed friction clutch.

DE 40 06 486 A1 shows a turntable for moving gears, which turntable is driven by a drive motor, that is positively connected to the turntable by a toothed belt.

DE 43 45 090 A1 describes a turntable which is frictionally driven by the use of a cable.

DE 197 08 389 A1 describes a rail switch for a rail-operated floor conveying system. A pivotable support for a rail is frictionally connected with a belt.

A device for direction changing of rail-guided conveying carts is known from U.S. Pat. No. 1,800,722. A pivotable element can be uncoupled from a drive mechanism by the use of a coupling device.

SUMMARY OF THE INVENTION

The object of the present invention is directed to providing devices for changing the direction of conveying devices.

In accordance with the present invention, the object is achieved by the use of a direction changing device which includes an upper element, that receives the material being conveyed, and a lower element. The upper element is supported by the lower element and can be swiveled with respect to it by a drive assembly. The drive assembly is connected to the upper element by a drive belt. A frictional connection exists between one of the drive assembly and the belt or the belt and the upper element.

The advantages which can be achieved by the present invention reside, in particular, in that an effective overload protection is achieved by the frictional force transfer from drive belt or belts to the horizontally swivelable upper element of the device. Since drive forces can be transferred only by friction between the drive belt and the upper element and only up to a defined maximum value, this maximum value will not be exceeded. This means that if forces greater than this defined maximum value act between the drive belt and the upper element, the upper element will slip with respect to the drive belt. Any damage to other components, for example to the motor or to certain gear elements, is thus impossible. An adjustable tensioning roller, which can be brought into contact with the drive belt in various positions, can be employed for setting the forces which can be maximally transferred between the drive belt and the upper element. The tension of the drive belt can be changed by changing the position of the tensioning roller. Correspondingly higher or lower values of the forces transferred by the frictional connection result from changing of the tension of the drive belt by use of the adjustable tensioning roller.

A further advantage of the present invention rests, in particular, in that the force transfer between the drive mechanism and the upper element can be selectively interrupted by the inclusion of a coupling device. The drive mechanism and the upper element are kinematically coupled with each other in a first operational state of the coupling device, so that every positional change of the drive mechanism causes a positional change of the upper element, and each positional change of the upper element causes a positional change of the drive mechanism. In a second operational state of the coupling device, the upper element and the drive mechanism are kinematically decoupled from each other, so that the drive mechanism and the upper element can be moved independently of each other. By use of this coupling, it is made possible, in particular when the drive mechanism fails, to decouple the upper element from the drive mechanism by activating the coupling device, so that the upper element can be manually horizontally swiveled by the operator.

So that a decoupling of the drive mechanism from the upper element can be performed as quickly as possible in connection with devices arranged under the floor, it is preferable to be able to operate the coupling device from the top of the device.

So that the coupling device can be manually decoupled, in particular in case of an electrical failure, it should preferably also be at least manually operable.

An adjustable tensioning roller, in particular, can be employed as a coupling device, which adjustable tensioning roller can be brought into contact with the drive belt in at least two positions. In the first position, the tensioning roller tensions the drive belt at least sufficiently strongly so that a driving force can be frictionally transferred from the drive belt to the upper element. In the second position of the tensioning roller, the belt is relaxed at least sufficiently for the upper element to be rotated with respect to the lower element substantially without having to overcome frictional forces acting between the drive belt and the upper element. The drive mechanism can be coupled in or out by displacing the tensioning roller between its first and second positions.

BRIEF DESCRIPTION OF THE INVENTION

A preferred embodiment of the present invention is represented in the drawings and will be described in greater detail in what follows.

Figure 2:
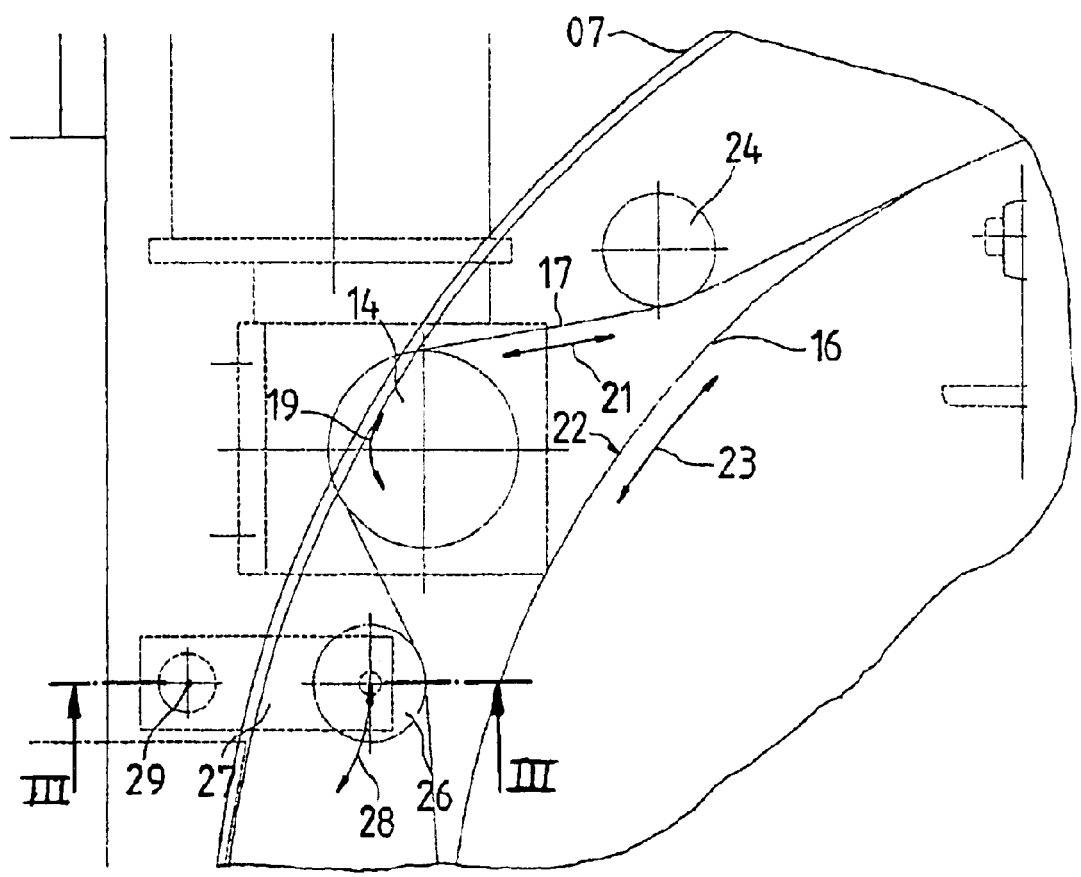
Figure 3:
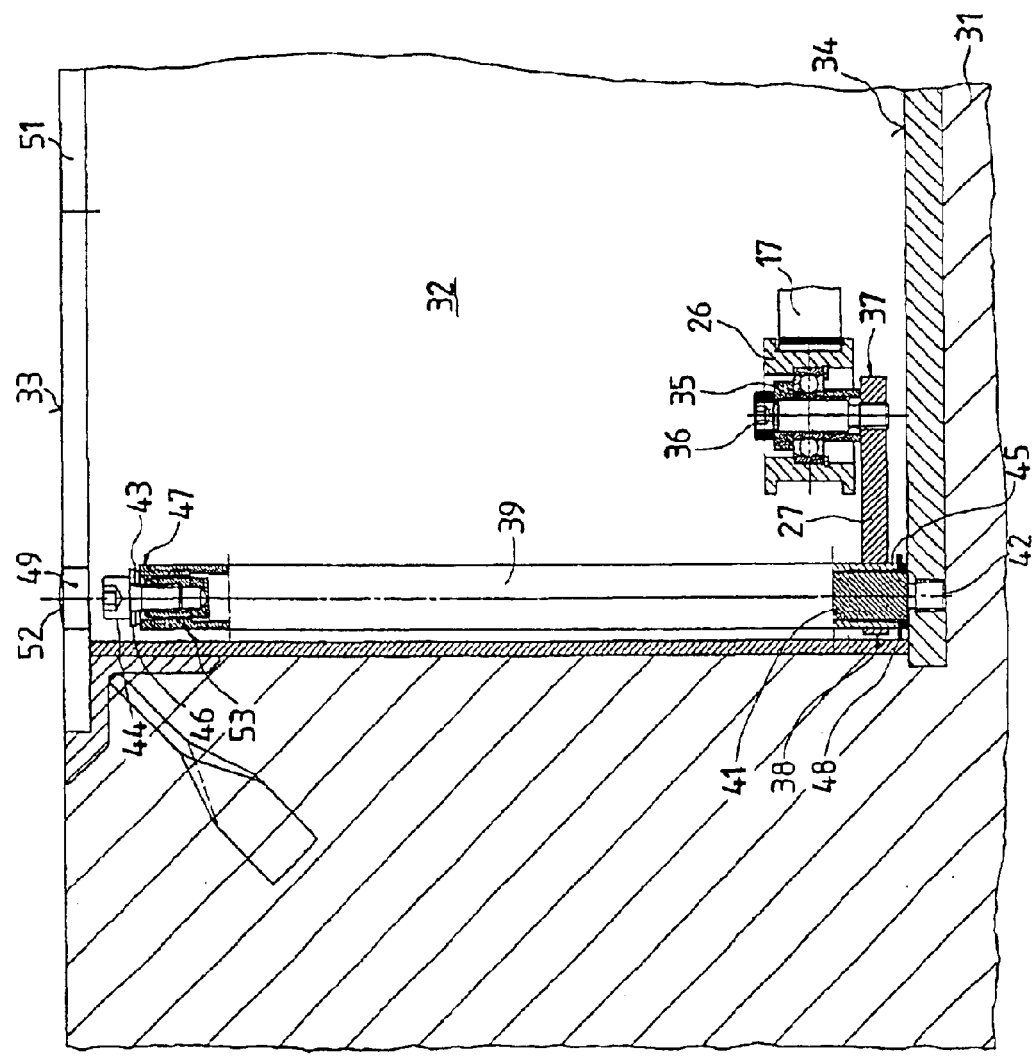

Shown are in:

FIG. 1, a schematic top plan view of a device for changing the direction of a transport device in accordance with the present invention, FIG. 2, a belt drive portion of the device shown in FIG. 1, also in a top plan view, and in FIG. 3, the belt drive shown in FIG. 2 in a cross-sectional view along the section line III—III of FIG. 2.

DESCRIPTION OF THE PREFERRED EMBODIMENT

Referring initially to FIG. 1, there may be seen a device 01 for changing the direction of travel of a conveying device or of a transport device, for example the travel direction of rail-guided conveying carts 02, on which horizontally placed supply rolls of paper or the like can be placed and thus conveyed. The direction changing device 01 is arranged in a recess 32 of a base body 31, as shown in FIGS. 1 and 3, in a crossing area between first and second crossing sets of tracks 03 and 04. The conveying carts 02, on each of which a horizontally placed supply roll can be conveyed, can be displaced in the longitudinal direction on the sets of tracks 03 and 04, as indicated by the directional arrow 06 in FIG. 1.

A rotatably supported upper element 07 of the direction changing device 01, on which a section of track 08 for receiving the conveying carts 02 is provided, can be horizontally swiveled, in the direction shown by the directional arrow 09, until the track section 08 is aligned with either of the sets of tracks 03 or 04. Then the conveying cart 02 is displaced until is completely arranged on the upper element 07 of the direction changing device 01. Thereafter, the upper element 07 can be swiveled by 90° or, if required for aligning the supply rolls in a different defined longitudinal direction, by 180° or 270°. By this positional change, the track section 08 is aligned with a selected one of the sets of tracks 03 or 04, and can be further conveyed in the direction of the set of tracks 03 or 04.

A drive motor 12, as shown in FIG. 1, can be employed for driving the upper element 07, which upper element 07 is seated, rotatable around a central axis 11, on a lower element, which is not specifically represented in FIG. 1, which lower element is fixedly connected with the base body 31. A gear 13 and a driving pinion gear 14 are provided on the power take-off side of the drive motor 12, which drive motor 12 may be, for example an electric motor 12. A driving disk 16 is fastened on the underside of the upper element 07 and is opposite the driving pinion gear 14, as seen in FIG. 2. A belt 17, for example a toothed belt 17, is brought into positive engagement with the driving pinion gear 14 for transferring the torque provided by the drive motor 12 on the power take-off side. The belt 17 itself is carried on a smooth-faced circumferential surface 22 of the driving disk 16 and transfers the drive output from the driving pinion gear 14 to the driving disk 16 in a non-positive way by the frictional forces acting between the circumferential surface 22 of the driving disk 16 and the belt 17.

For setting the tension of the belt 17, with which tension the belt 17 is stretched over the driving pinion gear 14 and over the circumferential surface 22 of the driving disk 16, it is possible to push a pivotably seated tensioning roller assembly, generally at 18, against the belt 17. Pivotable tensioning roller assembly 18 is depicted generally in FIG. 1.

The main components of the belt drive of the direction changing device 01 can be seen in the top a view shown in FIG. 2. The inner surface of the drive belt 17 comes into positive contact with the circumferential surface 22 of the driving pinion gear 14, so that it is possible by the provision of a rotatory drive of the driving pinion gear 14, in accordance with the directional arrow 19, to cause a forwardly or rearwardly directed control movement of the belt 17, which belt movement direction is indicated by the directional arrow 21. The inner surface of the belt 17 itself rests against the smooth-faced outer circumferential surface 22 of the driving disk 16. The driving disk 16 is thus frictionally driven by its contact with the inside of the belt 17, so that, as a result, a swiveling or rotational movement of the driving disk 16 and of the upper element 07, which is arranged above the driving disk 16, in accordance with a directional arrow 23, again as seen in FIG. 2, can be provided. The drive arrangement 12, 13, 14 can alternatively be frictionally connected and the driving disk 16 can be positively connected with the belt 17.

The belt 17 is deflected by a deflection roller 24 and by a tensioning roller 26, which rollers 24 and 26 are situated between the driving pinion gear 14 and the driving disk 16, as shown most clearly in FIG. 2. The tensioning roller 26 is rotatably supported on a first or outboard end 37 of a pivot arm 27. The pivot arm 27 can be pivoted at its second or inner end 38 around a pivot shaft 29 in accordance with a directional arrow 28. Depending on the engagement position of the pivot arm 27, the tensioning roller 26, which is part of the tensioning roller assembly 18, is pressed against the belt 17 with a higher or lower pressure, so that the tension of the belt 17 can be changed by use of this tensioning roller.

The frictional forces which can be transferred from the belt 17 to the driving disk 16 are directly correlated with the tension of the belt 17, which belt tension can be affected by the tensioning roller 26. It follows from this that, with an appropriate relaxation of the belt 17, by swiveling the tensioning roller 26 outward, the drive output which can be maximally transferred between the belt 17 and the driving disk 16 can be changed. As soon as the belt 17 is relaxed to the extent that it essentially rests without contact pressure on the smooth, outer circumferential surface 22 of the driving disk 16, no drive output can be transferred from the driving pinion gear 14 to the driving disk 16.

As a result, it is therefore possible to use the tensioning roller 26 in the manner of a coupling device by pivoting the pivot arm 27. By using the tensioning roller 26 to exert an appropriate tension on the belt 17, the belt 17 will now be forced against the circumferential outer surface 22 of the driving disk 16 with such a high contact pressure that the upper element 07 can only be swiveled while the driving pinion gear 14 is simultaneously rotating. If the tensioning roller 26 is displaced by pivoting the pivot arm 27, so that the belt 17 is essentially no longer under tension, the driving disk 16 can slide with respect to the belt 17 essentially without resistance, so that, for example, the upper element 07 can be manually swiveled without the driving pinion gear 14 or the drive belt 17 having to rotate together with the upper element 07.

The mechanism which is operable for the adjustment of the tension roller 26 is represented in FIG. 3. So that the direction changing device 01 can be arranged under the floor, a recess 32, for example a bed, which is only partially shown in FIG. 3, is provided in the base body 31. The direction changing device 01 can be arranged in recess 32 in such a way that the top of the upper element 07 essentially extends in the horizontal plane 33 that is defined by the top of the base body 31. In the preferred embodiment of the present invention, the drive mechanism of the direction changing device 01, which essentially consists of the drive motor 12, the gear 13 and the driving pinion gear 17, is also arranged in the recess 32, wherein the drive motor 12 is fastened to the bottom 34 of the recess 32. The bottom 34 of the recess 32 forms the lower, fixed element of the device 01 for changing a direction of travel of a conveying device.

The tensioning roller 26 is rotatably seated, by the use of a rolling bearing 35 on a bolt 36. The bolt 36 itself has been screwed into the pivot arm 27 on the first or outboard end 37 of the pivot arm 27. The second or inner end 38 of the pivot arm 27 has a cutout or aperture, in which a sleeve 39, for example embodied as an elongated tube, can be fastened. A shaft 41 extends along the length of the interior of the sleeve 39. A lower end 42 of the shaft 41 has been glued, by the use of an adhesive, into a cutout of the base body 31 and is used as an anchoring element. A tensioning element 44 which, in the preferred embodiment, is provided in the manner of a tensioning screw 44, can be actuated by screwing the tensioning screw 44 in. Starting at a defined screw insertion depth, the tensioning element 44 engages indirectly through an intermediate washer 46, the upper end 47 of the elongated sleeve 39. By further screwing in of the tensioning element 44, the distance between the bottom 34 of the recess 32 and the underside of the washer 46 is further shortened, so that, as a result, the elongated sleeve 39 can be clamped between the washer 46 and the base body 31 by screwing in the tensioning element 44. So that the tensioning force exerted through the increasing screwing in of the tensioning element 44 rises as continuously and as linearly as possible, and not suddenly, an elastic element 48, for example a rubber washer 48, is positioned between the lower end 45 of the sleeve 39 and the bottom 34 of the recess 32, which rubber washer 48 is elastically compressed when the sleeve 39 is clamped down by screwing in of the tensioning element or screw or bolt 44.

To change the tension imparted to the belt 17 by the tensioning roller 26, the tensioning element 44 is released or screwed out sufficiently far, so that the elongated sleeve 39 can be turned on the shaft 41. Because of this, the position of the tensioning roller 26 relative to the belt 17 changes, so that a desired belt tension can be set. For actuating the coupling device, which is substantially constituted by the tensioning roller 26, the pivot arm 27, the sleeve 39 and the shaft 41, simply and essentially without having to disassemble other components, a cutout 49 is provided above the tensioning element 44 in a cover plate 51, by use of which cover plate 51 the recess 32 can be covered. A tool, for example a socket wrench, can be passed through the cutout 49 and the tensioning element 44 can be actuated in this manner.

For setting the tension of the belt 17 it is advantageous that the tensioning element 44 does not need to be completely released for resetting the pivot arm 27. Otherwise it would be necessary, during the adjustment of the pivot arm 27, to simultaneously hold the sleeve 39 in place and to tighten the tensioning element 44. For this reason, surfaces 53, on which tools can act, are provided at the upper end 47 of the elongated sleeve 39, for example in the shape of a hexagon 53, with which hexagonal surfaces 53 a tool for rotating the sleeve 39 can be brought into engagement. In that case, to adjust the pivot arm 27, the tensioning element 44 is only sufficiently loosened or screwed out so that the sleeve 39 can be rotated with the aid of a tool, for example a tool in the form of a hexagon sprocket. Following the adjustment of the pivot arm 27, the tensioning element 44 is again sufficiently tightened so that the sleeve 39 is clamped with a sufficient holding force. Thereafter, the cutout 49 in the cover plate 51 can be closed by the use of an appropriately shaped cover element 52.

As a result, the coupling device constituted by the tensioning roller 26, the pivot arm 27, the elongated sleeve 39 and the shaft 41 can therefore be manually actuated by loosening, or screwing in of the tensioning element 44 and by subsequent rotation of the sleeve 39. It is thus assured that the drive mechanism, constituted by the drive motor 12, the gear 13 and the driving pinion gear 14, can be decoupled at any time, in particular in case of a possible failure of the drive mechanism, from the upper element 07 of the device 01, so that the upper element 07 can be manually swiveled by the operators.

Since the sleeve 39 and the shaft 41 extend upward to a location close to the underside of the cover plate 51, it is possible to operate the coupling device without having to disassemble other components, except for the removal of the cover plate 52.

The conveying cart 02 is primarily configured as a rail-guided conveying cart 02 for receiving paper rolls for conveyance to a roll changer of a rotary printing press.

While a preferred embodiment of a device for changing a direction of travel of a conveying or a transport device, in accordance with the present invention has been set forth fully and completely hereinabove, it will be apparent to one of skill in the art that a number of changes in, for example the sizes of the conveying carts, the type of rotary printing press used with the device, and the like could be made without departing from the true spirit and scope of the present invention which is accordingly to be limited only by the following claims.

What is claimed is:

1. A device for changing a direction of travel of a conveying means, said device comprising:
   a lower element and an upper element, said upper element being supported on said lower element for swivelable movement with respect to said lower element, said upper element being adapted to receive the conveying means;
   a drive mechanism usable to swivel said upper element with respect to said lower element, said drive mechanism including a drive belt;
   a driving disk having a smooth faced circumferential surface on said upper element, said drive mechanism being positively connected with said drive belt and said circumferential surface being in frictional engagement with said drive belt; and
   means for varying a tension in said drive belt and for decoupling said drive mechanism and said upper element.

2. The device of claim 1 wherein said drive mechanism includes a drive motor and a driving pinion gear, said driving pinion gear being adapted to be positively connected with said drive belt.

3. The device of claim 1 wherein said drive belt is a toothed belt.

4. The device of claim 1 wherein said means for varying said tension in said drive belt includes a movable drive belt tensioning roller adapted to engage said drive belt and to vary said tension in said drive belt, said drive belt tensioning roller being usable to decouple said drive mechanism and said upper element.

5. The device of claim 1 further including a coupling device interposed between said drive mechanism and said upper element, said coupling device being movable between a first position in which said drive mechanism and said upper element are kinematically coupled and a second position in which said drive mechanism and said upper element are kinematically decoupled.

6. The device of claim 5 further including a base body including a recess for receiving said device, said coupling device being operable from a position above said device.

7. The device of claim 5 wherein said coupling device is manually operable.

8. The device of claim 1 wherein said upper element includes a track section, said track section receiving said conveying means.

9. The device of claim 1 wherein said conveying means are rail guided conveying carts adapted to receive supply rolls for conveyance to a rotary printing press.

10. A device for changing a direction of travel of a conveying means, said device comprising:

a lower element and an upper element, said upper element being supported on said lower element for swivelable movement with respect to said lower element, said upper element being adapted to receive the conveying means;

a drive mechanism usable to swivel said upper element with respect to said lower element, said drive mechanism including a drive belt;

a coupling device interposed between said drive mechanism and said upper element, said coupling device being shiftable between a first operating state in which said drive mechanism and said upper element are kinematically coupled, and a second operating state in which said drive mechanism and said upper element are kinematically decoupled;

a tensioning roller in said coupling device, said tensioning roller being movable between a first, drive belt tensioning position, and a second, drive belt untensioning position, said drive belt exerting a frictional driving force on said upper element in said first drive belt tensioning position of said tension roller, said drive belt being sufficiently frictionally disengaged from said upper element in said second drive belt untensioning position of said tensioning roller to allow said swiveling movement of said upper element;

a pivot arm, said tensioning roller being supported on said pivot arm;

a shaft, said pivot arm being supported on said shaft for pivotal movement with respect to said shaft; and a recess having a bottom, a lower end of said shaft being secured to said bottom of said recess, an upper end of said shaft being engageable from above said recess.

11. The device of claim 10 further including means to fix said pivot arm in first and second pivot arm positions.

12. The device of claim 10 further including a sleeve carried by said shaft, said pivot arm being connected to said sleeve at a first end remote from said tensioning roller, and a sleeve tensioning element on said upper end of said shaft, said tensioning element being selectively engageable with said sleeve whereby said sleeve can be clamped between said tensioning element and said recess bottom.

13. The device of claim 12 further including tool receiving surfaces on said sleeve, said tool receiving surfaces being engageable by a tool for use in rotating said sleeve with respect to said shaft.

14. The device of claim 12 wherein said sleeve tensioning element includes a screw, said screw being received in said upper end of said shaft, said sleeve being clamped between said bottom of said recess and said screw.

15. The device of claim 12 further including a cover plate for said recess, said cover plate having a cutout, said sleeve tensioning element being accessible through said cutout.

16. The device of claim 15 further including tool receiving surfaces on said sleeve, said tool receiving surfaces being engageable by a tool, said tool engaging said tool receiving surfaces through said cutout.

17. The device of claim 15 further including a cover for said cutout.

18. The device of claim 12 further including an elastic element interposed between said bottom of said recess and said sleeve.

19. The device of claim 12 wherein said lower end of said shaft is glued to said bottom of said recess.

20. The device of claim 10 wherein said coupling device is manually operable.

* * * * *